(12) United States Patent
Kelleher

(10) Patent No.: US 6,327,762 B2
(45) Date of Patent: Dec. 11, 2001

(54) TOOL FOR ADJUSTING A WEDGE AND SLIDE ASSEMBLY IN A GENERATOR STATOR SLOT WEDGE SYSTEM

(75) Inventor: James Charles Kelleher, Ballston Spa, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/778,717

(22) Filed: Feb. 8, 2001

Related U.S. Application Data

(62) Division of application No. 09/453,776, filed on Dec. 3, 1999, now Pat. No. 6,294,855.

(51) Int. Cl.[7] .................................................... B23P 19/04
(52) U.S. Cl. .............................................................. 29/267
(58) Field of Search ............................ 29/267, 270, 278; 254/131, 104

(56) References Cited

U.S. PATENT DOCUMENTS

| | | |
|---|---|---|
| 1,320,126 | 10/1919 | Dudley . |
| 2,316,635 | 4/1943 | Staak . |
| 2,990,486 | 6/1961 | Willyoung . |
| 3,139,550 | 6/1964 | Geer . |
| 3,842,303 | 10/1974 | Simmonds et al. . |
| 4,149,101 | 4/1979 | Lesokhin et al. . |
| 4,184,091 | 1/1980 | Khutoretsky et al. . |
| 5,701,650 | * 12/1997 | LaFleur et al. ........................ 29/267 |

* cited by examiner

Primary Examiner—Robert C. Watson
(74) Attorney, Agent, or Firm—Nixon & Vanderhye P.C.

(57) ABSTRACT

A generator stator including a magnetic core having a plurality of axially extending radial slots arranged about the periphery thereof with windings in each radial slot; at least one adjustable assembly axially inboard of an outermost end assembly in each radial slot, arranged to restrain the windings in the radial slot the adjustable assembly comprising mating wedge and slide components which interface along stepped matching surfaces, the wedge component having an elongated slot therein providing access to the slide component. A tool is provided and includes a tool head pivotally secured to a handle. The tool head is formed with a stub adapted to seat in a hole in the slide component via the slot.

1 Claim, 2 Drawing Sheets

TOOL FOR ADJUSTING A WEDGE AND SLIDE ASSEMBLY IN A GENERATOR STATOR SLOT WEDGE SYSTEM

This is a divisional of application Ser. No. 09/453,776, filed Dec. 3, 1999, now U.S. Pat. No. 6,294,855 the entire content of which is hereby incorporated by reference in this application.

BACKGROUND OF THE INVENTION

This invention relates to generator stators and, more specifically, to a wedge and slide system that can be used internally of the end wedge and permits in situ radial correction for radial pressure and dimension losses which occur over time.

Electric utility companies require large turbine-generators to operate reliably for long periods of time, for example, thirty years or more. Normal, steady-state electromagnetic forces acting on the armature winding are capable of causing armature bar vibration within a much shorter period than the expected generator lifetime. Armature bar vibration can occur if radial clearances are present within the stator core slot. Bar vibration can result in armature bar insulation abrasion. The abrasion can become severe if maintenance actions are not taken to retighten the slot support system and arrest the vibration. Typically, a prolonged maintenance outage is required to retighten the slot support system and eliminate radial clearances within the slot.

The electrical windings within the ends of the stator core slots may become susceptible to accelerated abrasion due to: 1) pre-existing or rapidly-evolving radial clearances, 2) the effects of excessive or continuous oil contamination, and 3) abnormally high electromagnetic design forces on the slot portion of the winding. It is therefore important to provide an in situ means for eliminating radial clearances that develop in this location in order to prevent unscheduled or prolonged service outages.

In an attempt to address at least some of these problems, a stepped wedge and slide arrangement is proposed in U.S. Pat. No. 4,149,101 but for the purpose of preventing axial displacement of wedges within the core slot. A stepped bracing arrangement is proposed in U.S. Pat. No. 3,842,303 but in the context of an end winding support fit-up device between the coil end arms.

A stepped dovetail wedge and slide system which permits retightening of the generator stator end slot wedges so as-to restore the required radial force on the winding bars is disclosed in copending application Ser. No. 09/453,776 filed Nov. 22, 1999, now U.S. Pat. No. 6,294,855 and entitled "Adjustable Generator Stator Slot Wedge System").

BRIEF SUMMARY OF THE INVENTION

This invention provides an improved mechanism for tightening generator stator internal slot wedges (wedges which are inboard of the end wedges), and restoring the required radial force on the winding bars in a location where loosening can occur. It also allows the tightening process to be carried without the removal of the generator field.

The invention also increases the long term durability and reliability of the internal wedges by making design and materials improvements which also contribute to decreasing the outage frequency for generator inspections and down time.

In an exemplary embodiment of the invention, an adjustable version of the restraining device commonly referred to as a stator slot wedge is provided. The principal purpose of the stator slot wedge is to supply a radial force to the armature winding (stator bars) to prevent it from vibrating under the influence of electromagnetic forces which act continuously during normal operation and which can become much more severe under conditions caused by misoperation or system faults.

The invention has several features which in combination yield the unique support device, the main feature of which is adjustable tightening of internal wedges in place, i.e., without removal of the generator field. The individual design features include: (1) an oblong slot in the wedge component that provides access for a tightening tool; (2) rounded holes in the slide component that serve as an insert location for a tool designed to provide proper tightening; and (3) stepped internal wedges and slides, otherwise similar to the end wedges and slides in the above identified co-pending application, that prevent reverse axial movement or loosening.

In the exemplary embodiment, wedge and slide components are provided that are similar to those disclosed, in copending application Ser. No. 09/453,776, now U.S. Pat. No. 6,294,855 identified above. In accordance with this invention, an elongated or oblong slot is formed in the wedge component that provides access to the stepped surface on the underlying slide component. In addition, a series of round holes are provided in the slide component in generally aligned relationship with the slot, to allow the head of an adjustment tool to be inserted through the slot and into one of the holes on the slide component. By appropriately locating and then pushing the tool inwardly, the slide component is moved inwardly in a ratcheting type action, to tighten the internal slot wedge/slide assembly and thereby restore the required radial force on the winding bars.

Accordingly, in its broader aspects, the present invention relates to a generator stator including a magnetic core having a plurality of axially extending radial slots arranged about the periphery thereof with windings in each radial slot; at least one adjustable assembly axially inboard of an outermost end assembly in each radial slot, arranged to restrain the windings in the radial slot, the adjustable assembly comprising mating wedge and slide components which interface along stepped matching surfaces, the wedge component having an elongated slot therein providing access to the slide component.

In another aspect, the invention relates to a generator stator including a magnetic core having a plurality of axially extending radial slots arranged about the periphery thereof with windings in each radial slot; at least one adjustable assembly axially inboard of an outermost end assembly in each radial slot, arranged to restrain the windings in the radial slot, the adjustable assembly comprising mating wedge and slide components which interface along stepped matching surfaces, the wedge component having an elongated slot therein providing access to the slide component; wherein a second adjustable assembly is located axially inboard of the at least one adjustable assembly, the second adjustable assembly comprising a second wedge component and a second slide component having interengaging stepped surfaces, the second wedge component having an elongated slot therein providing access to the stepped surface in the slide.

In still another aspect, the invention relates to a tool for use in adjusting an axially inboard wedge and slide assembly in a generator stator slot wedge system, the tool comprising an elongated handle, a tool head comprising an elongated handle, a tool head pivotally secured to the handle, and a stub formed on a remote end of the tool head, the stub having a substantially cylindrical shape.

Other objects and advantages of the subject invention will become apprent from the detailed description which follows.

DETAILED DESCRIPTION OF THE INVENTION

Figure 1:
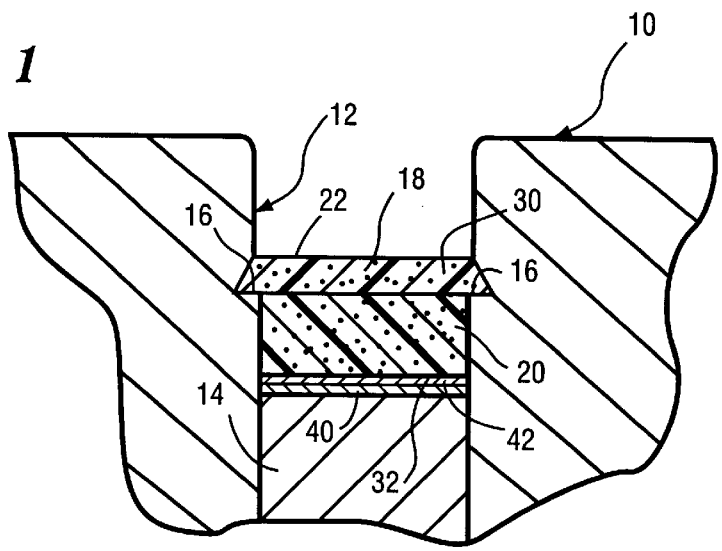
FIG. 1 is a partial axial section view of the stator core slot with slide and wedge components in place, so as to supply radial forces to the armature winding or stator bar.

Referring to FIG. 1, the magnetic stator core is partially shown at 10, with a plurality of radial slots 12 extending axially along the core stator windings 14. Each slot 12 is formed adjacent its mouth with a dovetail groove or undercut 16, permitting wedge and slide components 18, 20 to be inserted in an axial direction within the slot. Prior to the insertion of the end and inboard stepped wedge and slide assemblies, conventional wedges are inserted from the axial center of the core outwardly in opposite directions. The individual wedges are generally between about 4 and 7 inches in length, and the stator core may have a length of between about 60 and 330 inches. The two axially adjacent wedge locations (the end location and the next adjacent location referred to herein as an inboard or internal location) at respective opposite ends of the core are fitted with the wedge and slide assemblies 18, 20 and 40, 42 described in greater detail below. This invention relates specifically to the wedge and slide components at the inboard location adjacent the end wedge and slide components.

Figure 2A:
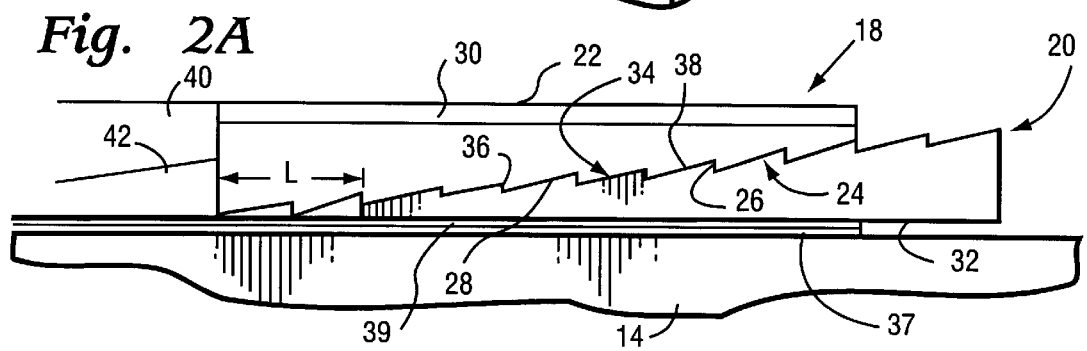
FIG. 2A is a partial side elevation of end wedge and slide components in their initially installed condition.

With reference also to FIG. 2A, the end wedge 18 is formed with a flat top surface 22 and an inclined lower surface 24 machined to include a series of integral steps (i.e., 22 and 24 are stepped matching surfaces) defined by vertical shoulders 26 which connect adjacent inclined surface portions 28, with the wedge increasing in thickness in an "inward direction", i.e., in the insertion direction toward the axial center of the core 10. Along the axially extending sides of the upper portion of the wedge, there are laterally extending dovetail projections 30 which mate with the dovetail grooves 16 in the slot 12.

The end slide component 20 has a flat bottom surface 32 and an inclined upper surface 34 machined to include a series of steps defined by vertical shoulders 36 which connect adjacent inclined ramp portions 38, with the slide decreasing in thickness in the "inward" or insertion direction. The slide 20 is preferably a high strength laminate. The wedge and slide components 18, 20 thus interface along matching stepped contact planes (the inclined surface portions 28 and 38 are equal in length and have the same slope). Surface portions 28, 38 lie at an acute angle to the center axis of the core. It is preferred that this angle lie in the range of from about 3° to about 8°. Between the winding 14 and the slide 20, there are one or more axially extending filler strips 37, 39.

Figure 2B:
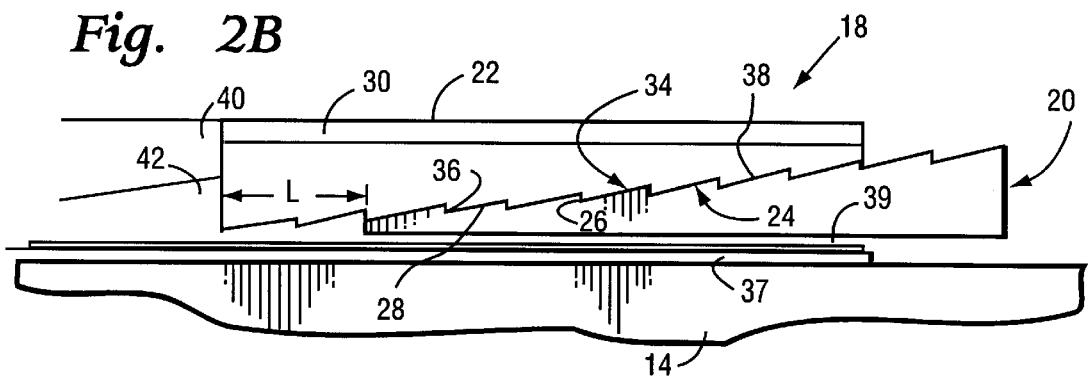
FIG. 2B is a view similar to FIG. 2A but with the slide and wedge components in a loosened condition.
Figure 2C:
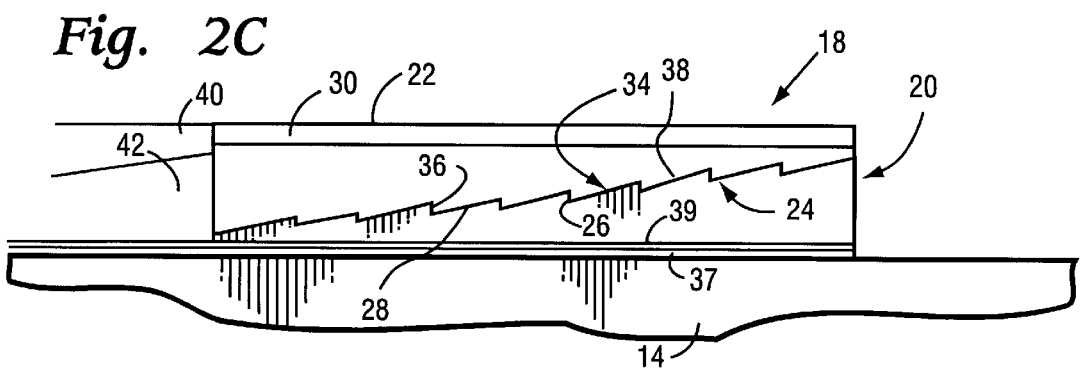
FIG. 2C is a section similar to 2A and 2B but with a slide component driven fully under the wedge component in order to correct the loosened condition shown in FIG. 2B.

While the wedge and slide components shown in FIGS. 2A, 2B and 2C are end wedge and slide components, it will be understood that the internal or inboard wedge and slide components (shown partially at 40, 42) are of similar design except as noted below. It should also be understood that the construction and materials employed in the construction of the inboard slide and wedge components 40, 42 may be as described in the above identified co-pending application.

During assembly, after the internal wedge and slide components 40, 42 have been inserted in the usual manner, the wedge and slide components 18, 20 are inserted in the slot 12, with the wedge 18 inserted first, supported by the dovetail grooves 16. With the filler strips 37, 39 located atop the winding 14, the slide 20 is inserted axially as shown in FIG. 2A, i.e., radially between the wedge 18 and the windings 14. As shown there, the slide 20 is driven tight in the axial direction to provide the required radial force on the winding bars, but with the capability to be driven axially an additional distance L, as needed at later dates, to eliminate radial clearances and to restore radial wedge force.

In FIG. 2B, the end slide and wedge assembly is shown in a loosened condition where radial clearances have developed in the slot as a result of bar and wedge shrinkage and compaction over time. Of course, the stepped configuration between the slide and wedge prevents the slide from "backing out" of the slot even though radial clearances have developed.

FIG. 2C illustrates a corrected and tightened condition where the slide 20 has been driven axially further into the slot through the distance L, so that the forward and rearward ends of the slide and wedge lie flush with one another. It will be understood that the depiction in FIGS. 2A–2C is schematic in nature and does not reflect the exact step size, slope, or axial travel.

Figure 3:
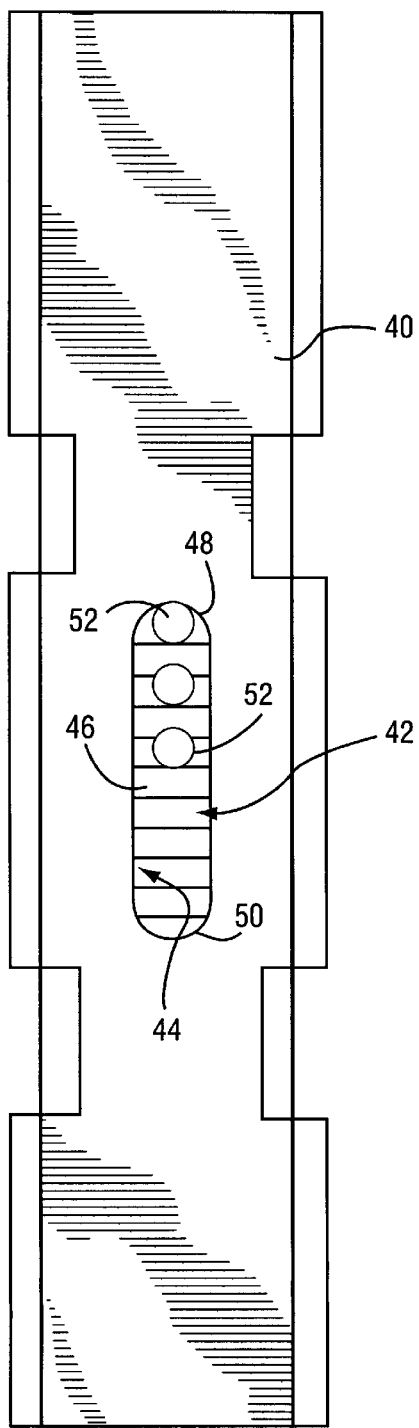
FIG. 3 is a plan view of internal slide and wedge components in accordance with the subject invention.
Figure 4:
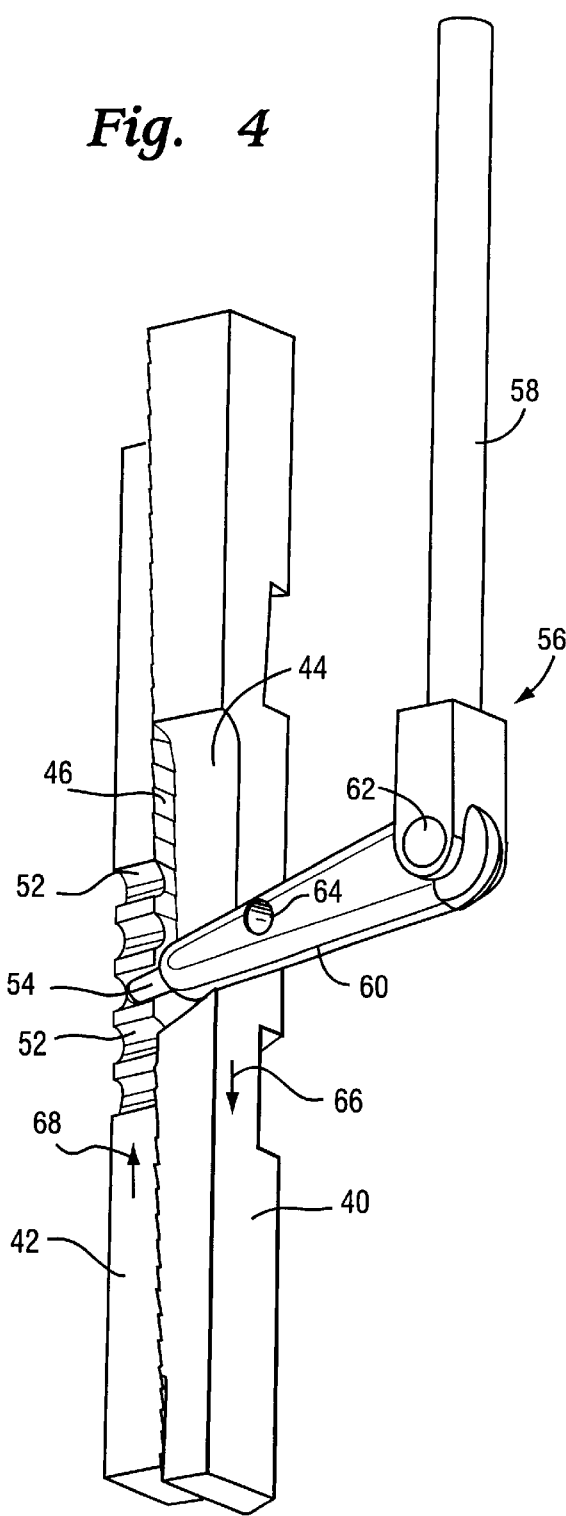
FIG. 4 is a perspective view, partially cut away, illustrating a tool in engagement with the internal slot and wedge components shown in FIG. 3.

There remains a need, however, to adjust the inboard or internal wedge and slide components 40, 42 as well. Turning now to FIGS. 3 and 4, the internal wedge component 40 is formed with an elongated or oblong slot 44 that exposes the stepped surface 46 on the internal slide component 42. The slot 44 is elongated, with rounded ends 48 and 50, and is located along the longitudinal axes of the wedge and slide components. The wedge component 42 is formed with a matching stepped surface 47 which engages the stepped surface 46 of the slide component.

A series of vertical (or radial) holes 52 are formed in the slide component 42, aligned with the slot 44 in the wedge component 40. These holes 52 are adapted to receive the forward, cylindrically shaped stub 54 of a tool 56 shown in FIG. 4.

The tool 56 includes an elongated handle 58 pivotally attached to a tool head 60 by means of a pivot pin 62, with the stub 54 located at the opposite end of the tool head from the pivot pin 62. It will be appreciated that the tool head 60 and handle 58 can be "straightened out," i.e., axially aligned and inserted in a space between the stator and rotor. A cable (not shown) can be attached to the head 60 via hole 64 and pulled to pivot the tool head 60 to the orientation shown in FIG. 4. The generally cylindrical stub 54 may then be located in one of the adjustment holes 52 via slot 44, and with the forward end of the head 60 in engagement with the rounded end 50 of the slot 44, the tool may be pushed forwardly to drive the slide relative to the wedge (creating opposing forces indicated by arrows 66, 68) along the matching stepped surfaces 46, 47 in a ratchet-like action to take up any radial clearance between the wedge and the stator.

Whether additional of the adjustment holes 52 are used is dependent upon the extent of the axial adjustment necessary to tighten the wedge.

The invention has particular application in any turbine-generator having high electromagnetic forces during normal operation which, in concert with other adverse conditions, might result in severe stator bar damage. It may be installed in new machines or retrofitted to existing units during rewedging or armature rewind operations.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A tool for use in adjusting an axially inboard wedge and slide assembly in a generator stator slot wedge system, the tool comprising an elongated handle, a tool head pivotally secured to said handle, and a stub formed on a remote end of said tool head, said stub having a substantially cylindrical shape; and wherein said tool is formed with means for attaching a cable for pulling said tool head to an angled orientation relative to said handle.

* * * * *

UNITED STATES PATENT AND TRADEMARK OFFICE
CERTIFICATE OF CORRECTION

PATENT NO.   : 6,327,762 B1
DATED        : December 11, 2001
INVENTOR(S)  : Kelleher Page 1 of 1

It is certified that error appears in the above-identified patent and that said Letters Patent is hereby corrected as shown below:

Title page,
ABSTRACT, line 6, after "slot" insert -- , --.

Column 1,
Line 47, delete "as-" and insert -- as --.

Column 2,
Line 21, after "disclosed" delete ";".

Signed and Sealed this

Twelfth Day of March, 2002

*Attest:*

*Attesting Officer*

JAMES E. ROGAN
*Director of the United States Patent and Trademark Office*